United States Patent

[11] 3,619,293

[72] Inventors: Masahiro Niimi; Tetsu Furukawa; Hitoshi Masada, all of Tokushima, Japan
[21] Appl. No.
[22] Filed Feb. 18, 1970
[45] Patented Nov. 9, 1971
[73] Assignee Nippon Shiryo Kogyo Co., Ltd. Tokushima, Japan
[32] Priority July 4, 1964
[33] Japan
[31] 37902/64
Continuation-in-part of application Ser. No. 412,259, Nov. 18, 1964, now abandoned, Continuation-in-part of application Ser. No. 593,372, Nov. 10, 1966, now abandoned, Continuation-in-part of application Ser. No. 626,399, Mar. 28, 1967, now abandoned.

[54] GRANULAR SUCROSE PRODUCTS AND PROCESS FOR PRODUCING SAME
6 Claims, 2 Drawing Figs.

[52] U.S. Cl.................................................... 127/30, 99/199, 127/61
[51] Int. Cl...................................................... C13f 1/02
[50] Field of Search............................................ 127/30, 46, 58, 60, 61; 99/199

[56] References Cited
UNITED STATES PATENTS
2,728,678 12/1955 Sharp........................... 99/199

Primary Examiner—Morris O. Wolk
Assistant Examiner—Sidney Marantz
Attorneys—Wenderoth, Lind and Ponack and Dawson, Tilton, Fallon and Lungmus ABSTRACT: Granular crystalline sucrose products are prepared from water solutions of sucrose containing noncrystallizable sugar, such as molasses. The sugar solution is subjected to partial crystallization to form a pumpable massecuite composed of microcrystals of sucrose dispersed in a water solution of the sucrose containing the molasses or other noncrystallizable sugar. The massecuite is sprayed into a drying air stream to form atomized droplets, and part of the water is removed to form granular aggregates of the sucrose microcrystals containing residual sucrose solution. The aggregates are aged and dried to form internally additional sucrose crystals and to further reduce water content. The products, comprising generally spherical granules formed of aggregates of microcrystals of sucrose, are characterized by being free-flowing and nonhygroscopic, and by rapid dissolution in water. The process is particularly adapted to the processing of partially refined cane sugar or beet sugar liquors to produce a brown sugar product of these characteristics.

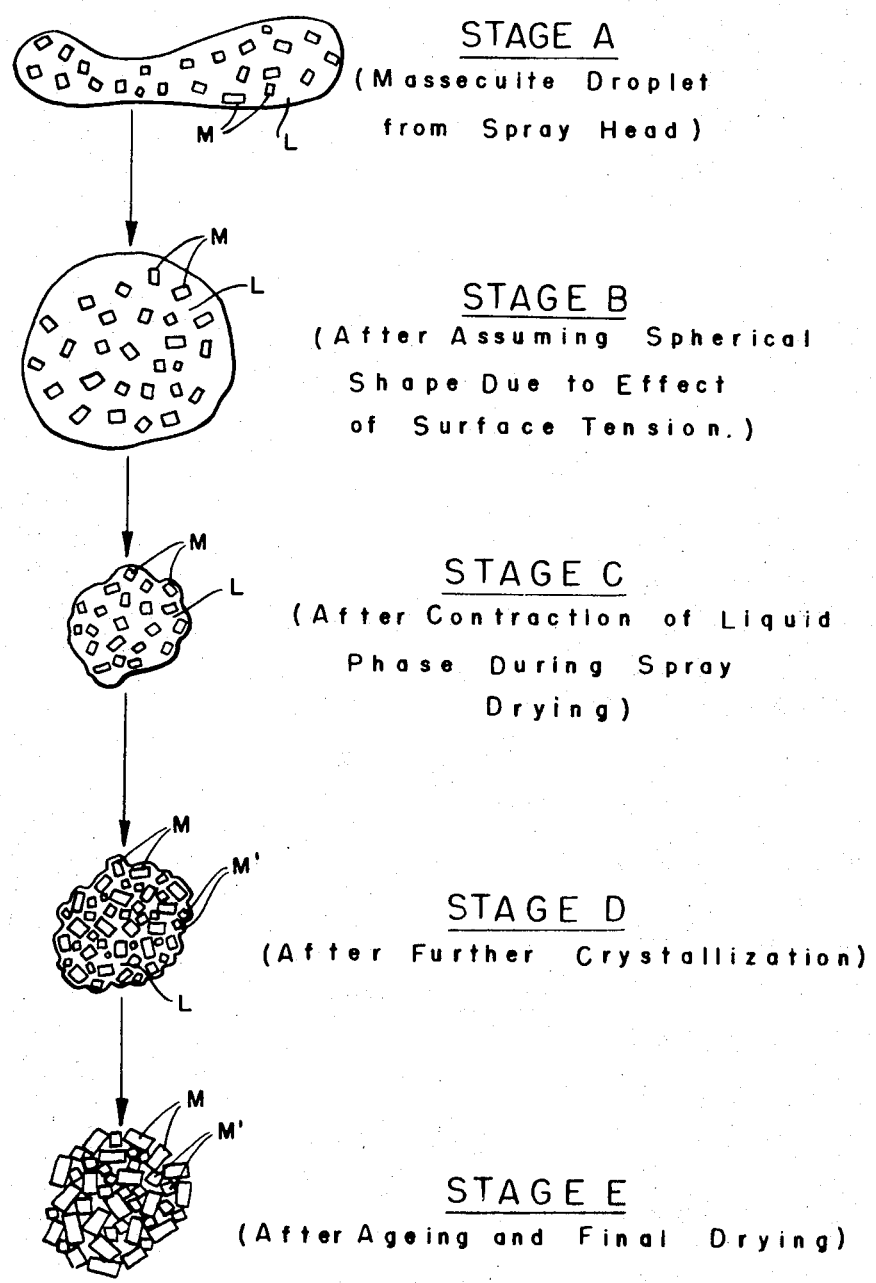

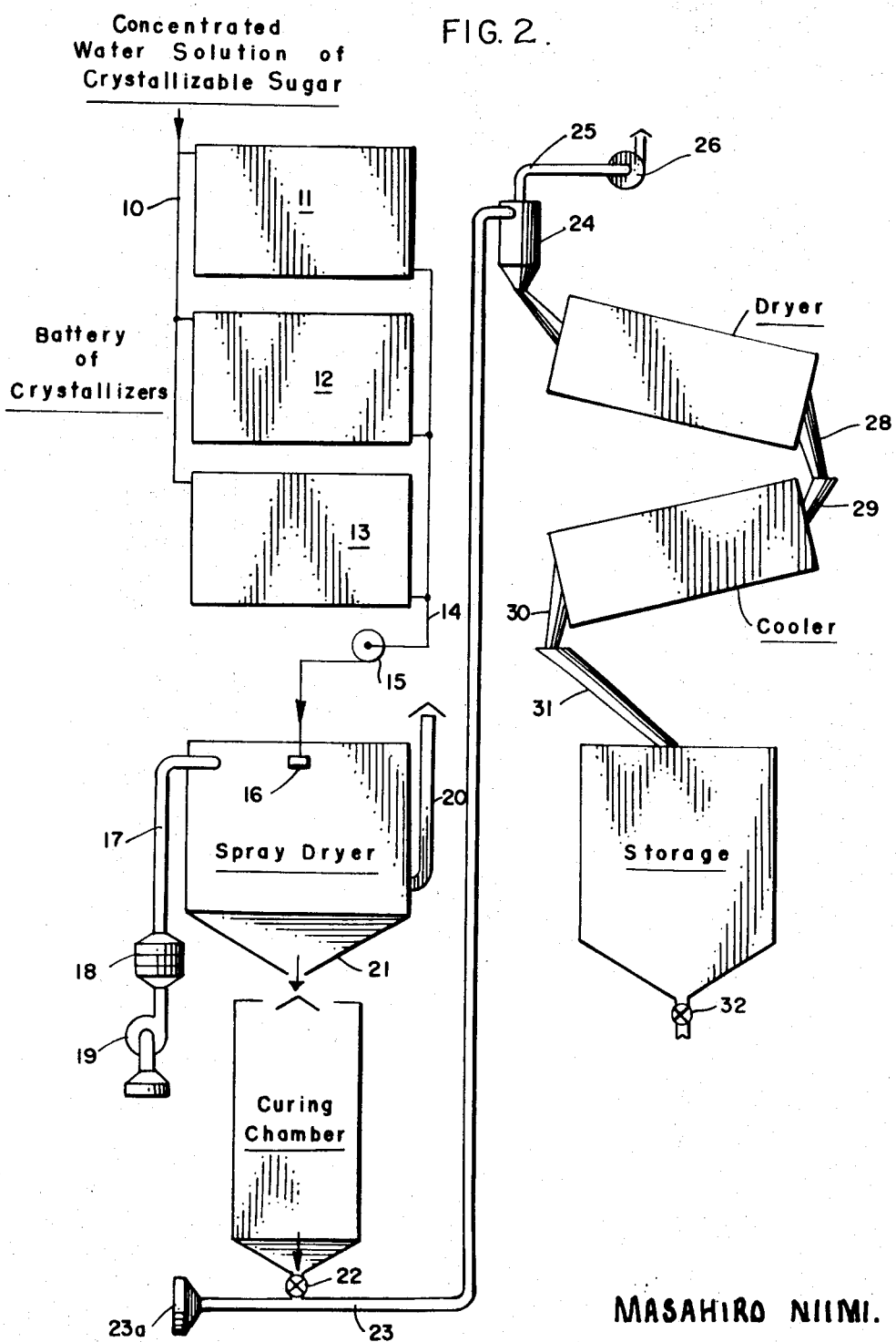

3,619,293

GRANULAR SUCROSE PRODUCTS AND PROCESS FOR PRODUCING SAME

REFERENCES

This application is a continuation-in-part of copending application Serial No. 674,168, filed Oct. 10, 1967, now patent 3,540,927 and of application Ser. No. 626,399, filed March 28, 1967 now abandoned. Said applications Serial Nos. 626,399 and 674,168 were continuations-in-part of application Serial No. 593,372 filed Nov. 10 1966, and now abandoned; which in turn was a continuation-in-part of application Serial No. 412,259, filed Nov. 18, 1964, and now abandoned.

BACKGROUND AND SUMMARY

For many years it has been necessary to process water solutions of crystallizable sugar, such as cane or beet sugar solutions, by standard crystallizing and separating operations to produce dry, free-flowing, relatively nonhygroscopic sugar products. Such crystallization processes are expensive and difficult to control. The concentrated water solution of the sugar, such as a cane sugar extract, is subjected to crystallization, but it is difficult to remove more than about 70 percent of the crystallizable sugar in a single crystallizing and separating operation. Further processing of the supernatant saturated solution is required to recover more of the sugar as a crystalline product, and residual supernatant remains after each crystallization. Various sugar byproducts are usually prepared from the residual supernatant. Molasses is a common byproduct from the crystallization of cane sugar, but it is of lesser value than the crystalline sucrose.

It is well known to the art of refining sucrose that sucrose crystals coated with molasses are sticky, hygroscopic, and nonfree-flowing The molasses comprises a noncrystallizable component. More specifically, molasses is composed of invert sugar, ash, and color, molassegenic components. In the production of crystalline sucrose, both from can sugar and beet sugar, molasses is a necessary byproduct, unless so-called "brown" sugar is the desired product. It is well known that brown sugar products tend to cake or form lumps in the package. For many years, attempts have been made to solve this problem by various special processing procedures for the production of brown sugar, however, although it is known that sucrose can be crystallized by spray drying, as described in United States patent of Paul F. Sharp, U.S. Pat. No. 2,728,678, no prior art worker has disclosed a spray drying process for brown sugar.

In solving the problem of producing a free-flowing sucrose product containing molasses or other noncrystallizable sugar, it was necessary to develop a radically new process for preparing a granular crystalline product from water solutions of sucrose. This new process involves the novel step of "spray-crystallization," which is distinguished from ordinary spray drying. In the spray-crystallization step, a sucrose massecuite containing preformed sucrose crystals is subjected to spray drying to form aggregates of sucrose crystals. The complete process consists of the sequence of steps in which the conversion of the sucrose to crystalline form occurs in sequential stages, including crystallization stages both before and after the spray drying step. Because of the short time involved in the spray drying step itself, most of the crystallization can occur before or after the spray drying. The spray-crystallization essentially forms the aggregate from preformed microcrystals.

In a preferred process, a water solution of sucrose is first subjected to partial crystallization to form a flowable or pumpable massecuite composed essentially of microcrystals of the sucrose dispersed in a water solution of the sucrose, which will usually be a substantially saturated solution. This solution may also contain a minor proportion of noncrystallizable sugar, such as molasses. The massecuite is subjected to a controlled spray drying. In the spray drying operation, atomized droplets of the massecuite are formed and part of the water is removed from the droplets while the droplets are air-borne, the water passing into the drying air stream, and the droplets being converted to soft granules, comprising aggregates of the sugar microcrystals while containing residual crystallizable sucrose solution. The soft granules are then aged and dried to form additional sucrose crystals therein, and to further reduce their water content. The final product may be substantially dry; that is, it may contain little or no free water, or it may contain several per cent free water (viz, 2 to 3 percent). Any remaining trace of free water is distributed within the granule aggregates, and therefore has little tendency to make the aggregates sticky or subject to caking. Moreover, the noncrystallizable sugar (e.g. molasses) is concentrated within the granules, while the sucrose crystals forming the exterior surfaces of the granules are substantially free of molasses or other noncrystallizable sugars.

The sucrose aggregates produced by this process are of a distinctive physical configuration. They are generally spherical and formed of cohered sucrose microcrystals, providing a hard, firm granular structure. As the water evaporates from the sprayed droplets, the solution phase causes the droplets to assume spherical shapes due to the effect of liquid surface tension. With further contraction of the liquid phase during the spray drying, the residual solution is withdrawn within the aggregates, being distributed between and over the surfaces of the sucrose crystals. After aging and further drying, additional sucrose crystals are formed within the interstices of the aggregates, and/or the sugar crystals are enlarged. In the final product, substantially all of the crystallizable sugar may be converted to crystalline form, leaving only the noncrystallizable sugar material. Since the noncrystallizable sugar is concentrated within the granules, there is little or no tendency for the noncrystallizable sugar to cause the product to become hygroscopic. The exterior surface of the aggregates are formed substantially entirely of the microcrystals which have the desired property of being nonhygroscopic. The granular aggregates, when observed through a microscope, resemble minute golf balls, showing cracked patterns of crystals on their surfaces.

DRAWINGS

The disclosure of the application is supplemented by the drawings attached hereto, comprising:

FIG. 1, which is a greatly enlarged illustration of the principal stages in the formation of the granular sucrose products; and FIG. 2, which is a nonscale diagrammatic illustration of a plant layout for practicing the process and producing the products of this invention.

DETAILED DESCRIPTION

This invention relates to a process for the spray crystallization of a crystallizable sugar and, more particularly, to a versatile process for rapidly producing spherical sugar particles from massecuite in a simple manner. The process is suited to the crystallization of cane or beet sugar liquors, especially solutions of partially refined sucrose containing molasses and/or other noncrystallizing material. Unlike chemical applications which may require the highest purity of sugar, the use of sugar as a foodstuff does not necessarily require the absence of certain naturally occurring impurities, many of which have a significant nutritive value. The requirement that sugar remain free-flowing and noncaking during transportation and storage makes necessary the removal of these minor nourishing impurities. It is the noncrystallizing character of the impurities which necessitates their removal if a free-flowing granular product is desired. Such impurities exist as noncrystalline films or solid solutions when dried. This causes the product to be water-sensitive (hygroscopic) and sticky in the presence of even small amounts of water. As a result, the mass will become nonfree-flowing and tend to cake.

With the present process the resulting spherical particles are aggregates of microcrystals, and any noncrystalline material which remains serves to cement them together and is concentrated in the interior of the agglomerates rather than on the surface. Moreover, since the spherical particles or granules contact each other at points rather than on surfaces, the contact surface is minimal, and therefore their free-flowing characteristic is maintained.

The granules or particles formed upon spray-crystallization assume a spherical shape in the air due to the surface tension of the liquid phase, and their volume is progressively reduced as the liquid is concentrated. If the somewhat moist particles are allowed to age for a short while after deposition, the crystallization continues both on the surface of and between the existing microcrystals, and each particle solidifies as its liquid portion is diminished. However, the liquid portion of each particle is prevented by its surface tension from migrating onto the surface of the particle but, rather, becomes concentrated toward the center of the particle. Hence, although the spherical particles as obtained above may contain some impurities, they are free-flowing and substantially free from caking tendencies.

In general, our invention involves four sequential steps or operations as follows:

1. Preparation of a massecuite with a fluidity suitable for pumping, and the crystalline portion of which consists of relatively small crystal sizes (e.g. microcrystals).

2. The regulation of spray-drying conditions, so that spherical granules of sugar are formed containing suitable amounts of moisture and which are capable of dropping efficiently onto the bottom of the spray chamber.

3. Regulation of aging or curing conditions under which the settled particles may undergo after-crystallization to the desired extent.

4. Elimination of residual moisture from the crystalline granules to give a product of the desired final moisture.

The above-mentioned steps can be carried out conveniently and in a definite sequence so that a granulated sugar may be produced with a relatively short processing time using equipment of simple construction. Not only is the process relatively less demanding from a manpower requirement standpoint than are conventional processes, but it is easily adaptable to automation and to a continuous method of operation.

For processing can sugar liquors, the optimum concentration of the final liquor varies somewhat depending upon the purity of the solute, but normally contains 15 to 25 percent moisture or is 75° to 85° Brix. When a cane sugar liquor of this concentration is cooled comparatively rapidly in a continuous precrystallizer with constant agitation, the viscosity of the liquor rises once but then soon drops as the crystals are progressively formed. The viscosity of the massecuite after the completion of crystallization preferably ranges from about 5,000 c.p.s. to about 10,000 c.p.s. in which range it may be easily pumped and sprayed. If desired, the sucrose massecuite may be admixed with additives before being subjected to the subsequent operations.

The optimum spraying conditions will vary somewhat with different types of equipment. A number of factors or variables such as: rate of air input, temperature and relative humidity of air, the amount and moisture content of the massecuite charge, the desired particle size, the distance or period of flotation in the air, etc., are inter-related so that a variation in one of them may require a variation in one or more of the others to obtain satisfactory operation. In spray-crystallizing the massecuite, it is essential not to effect the complete drying of the granules for the liquid phase of the massecuite can form a solid solution upon too rapid and complete evaporation. As a result the granules may tend to absorb moisture and cake during storage. It is important, therefore, to operate the process in such a manner that sufficient moisture is left in each granule to permit the gradual completion of the postcrystalization during aging or curing. After the completion of ageing or curing, the trace amount of water that still remains in the granule may be easily removed by means of a dryer which may be of conventional design.

Under a microscope the granules obtained by the above process appear as translucent, lustrous spheres. They are free-flowing and dissolve rapidly in water. This is, presumably because each granule, which is an aggregate of microcrystals, disintegrates on contact with water and the dispersed microcrystals then rapidly dissolve.

Some of the advantages of the spray-crystallization process of this invention as applied to cane sugar liquors (sucrose and molasses) may be summarized as follows:

1. Compared with conventional processes, the process of this invention may be easily carried out with much shorter process times and no special skill or complicated equipment is required.

2. The process is adaptable to continuous production and also to automation.

3. Unlike conventional processes, there is no recycling of mother liquor and, therefore, no molasses is produced as a byproduct. No troublesome filtration or centrifugation is necessary after the crystallization.

4. The products obtained by this process have many novel features, for example, homogeneous granules can be produced which are mixed crystals of various additives such as pharmaceuticals, synthetic sweeteners, condiments, food colors, other sugars, organic acids, plant extracts, etc.

Examples illustrating the processing of sucrose liquors follow:

EXAMPLE I

To a refined sucrose aqueous liquor of Brix 85° is added 5 percent of a previously prepared massecuite as seed. Under the effect of cooling and agitation in a crystalizer, microcrystals soon separate out. The time required for completion of crystallization is a function of the cooling efficiency, the quantity of seed crystals used, and other factors, but usually the crystallization is completed in 3 to 6 hours. The viscosity of the massecuite thus obtained is approximately 5,000 c.p.s. at 20° C. which permits it to be easily pumped and sprayed by an atomizer. This massecuite consists of substantially equal parts of solid and liquid phases. After the massecuite is subjected to the spray-crystallization process, the resulting particles or granules should contain from 2 to 5 percent moisture and they should be then allowed to gradually crystallize further at suitable temperatures so that no solid solution will be formed. This final crystallization during ageing of the granules is generally completed in 2 to 5 hours, although the time may vary somewhat depending on the purity of sucrose, the moisture content of the granules and the ageing conditions. After ageing, the spherical granules may be further dried as desired in any conventional manner.

EXAMPLE II

Massecuite is prepared in the same manner as example I. After the completion of the crystallization, the following materials were added to the massecuite in the crystallizer:
to 1,000 kg. of sucrose, add
100 kg. of concentrated orange juice
15 kg. of orange oil
0.2 kg. of Food Yellow No. 5 Spray-crystallizing the mixture as in example I yields homogeneously mixed spheres of the above components. Similar products can be made from other juices and flavors.

EXAMPLE III

Similarly as example I, a mixed sugar of sucrose and invert sugar can be solidified in a substantially crystalline power by the employment of the spray crystallization process of massecuite.

Under similar conditions to those described in example I, 5 percent of invert sugar is blended with 95 percent sucrose while the sugar is being dissolved, or while the massecuite is being prepared. When the resulting massecuite is processed similarly to example I, fine spherical granules containing about 2.5 percent each of glucose and fructose can be obtained which show different properties from a product made by blending the sucrose and invert sugar as dry powders. The product prepared by the method of this invention is more free-flowing and has less tendency to cake. This difference in physical properties is to be attributed to the distinctive structure of the spray dried granules, which include the invert sugar as a solid solution among sucrose microcrystals within the interiors of the granules. The invert sugar does not crystallize, but the product is still nonsticky and free-flowing.

EXAMPLE IV

The method of example II is readily applicable to the spray crystallization of crude sucrose containing 1–6 percent other sugars (noncrystallizable), such as those which are accumulated in mother liquor by the partial refining of raw sugar. As mentioned above, sucrose has long been manufactured by the decolorization of liquor and recrystallization in massecuite followed by separation of crystal from other liquor. The sugar refineries have accepted the necessity of repeated processing of mother liquors. However, the spray crystallization of massecuite can simplify such plants and operations. For example, after recovering more than half the total sucrose as a high grade crystal from raw sugar, the residual mother liquor can be concentrated, prepared as a microcrystalline massecuite, and then spray crystallized in spherical grains which are free-flowing. Impurities accumulated in mother liquor are principally homologous carbohydrates and inorganic salts, Therefore, the operating conditions of such liquor are quite similar to those described above. Ionic impurities can be previously removed by ion exchange resins. A decolorized and deionized raw sugar, and also mother liquor left after separating crystalline sugar, can be finished satisfactorily in the spherical fine grains by the spray crystallization process in a short period operation. There will remain no crude molasses, the molasses being in the crystalline granules. The product of purity containing more than 95 percent sucrose cannot be distinguished from crystalline sugar in their sweetness.

Referring to FIG. 1, the principal stages in the formation of the granular crystalline product are illustrated on a greatly enlarged scale. It will be understood that the illustrated stages are part of a continuous process, and therefore, to a certain extent, the illustrations are artificial or hypothetical. For example, in stage A, FIG. 1 shows an elongated droplet, as it might appear upon being discharged from the spray head. Since the massecuite is atomized to very fine droplet size, some of the droplets as discharged will be more nearly spherical than others, but FIG. 1 is intended to illustrate the average shape sequence, where the droplets as originally discharged are on the average more irregularly shaped than after partial drying. Where the microcrystals average 20 to 80 microns in diameter, the droplets can range from 100 to 200 microns in diameter.

In stage B, the droplet is shown as having assumed a generally spherical shape due to the surface tension of the liquid. Upon further removal of liquid, a condition is reached as shown in stage C, where the aggregate has a generally spherical shape, with a somewhat cracked or irregular outer surface. In FIG. 1 the microcrystals are indicated by the letter M, while the solution or liquid phase is indicated by the letter L. It will be understood that as the volume of the liquid phase L is reduced by the evaporation of water, the aggregate will contract and additional sugar crystals will form.

In stage D, which illustrates the condition of the aggregate after further crystallization, there is shown additional crystals M', being distributed between the original microcrystals M. At this stage, the granule still contains some additional solution L, but is sufficiently firm to permit it to be transferred to aging and drying equipment. Stage E shows the appearance of the aggregate after aging and drying. Further crystallization has occurred, forming additional crystal particles M', and substantially all of the liquid phase L has disappeared. In other words, there is substantially no free water, the water having evaporated.

The process of this invention can be practiced on a batch or continuous basis with various types of equipment. For example, a suitable plant layout is shown in FIG. 2. The concentrated water solution of the crystallizable sugar (viz sucrose) is passed through line 10, to crystallizers 11, 12, and 13 which discharge the crystalline massecuite produced therein to line 14. From what has been previously said, it will be understood that the massecuite is flowable and pumpable, and therefore can be delivered by pump 15 to a spray head 16 at the top of the spray dryer. A drying air stream is supplied to the spray dryer through a duct 17, which is connected to an air heater 18 and an air blower 19. The air containing the removed moisture is discharged through duct 20.

The microcrystal aggregates formed in the spray dryer are collected in a funnel section 21 and passed into the top of the curing chamber. This chamber provides a continuous curing bed, the granular material passing gradually downwardly and being discharged through a metered outlet 22 into a pipe conveyor 23 having an air intake 24 at its lower end. If desired the curing bed can be aerated or cooled to remove the heat of crystallization and to promote the curing. The upper end of conveyor pipe 23 communicates with the upper portion of a cyclone separator 24, which in turn connected to a suction duct 25 equipped with a suction blower 26. The aged granules flow out of the bottom of separator 24 through chute 27 into the feed end of a rotary dryer, and are discharged from the other end of the dryer into chute 28 which communicates with a chute 29 for introduction of the dried granules into a rotary cooler. The cooled granules passed to storage in a suitable hopper through connecting chutes 30 and 31, may be removed from the outlet 32 for suitable packaging. It will be understood that the design or type of components of the plant assembly of FIG. 2 can be varied considerably without departing from the basic processing steps described previously.

As a modification of the apparatus of FIG. 2, means may be provided for passing air through the curing chamber to aerate the granules during their residence therein. Such aeration is particularly desirable, where the residual water must be removed from the granules rather than being converted to water of crystallization, as by the formation of dextrosemonohydrate. Any remaining free water can be subsequently removed, by suitable equipment, such as in the illustrated rotary dryer.

In relation to the flowsheet of FIG. 2 and the foregoing examples, it will be apparent to those skilled in the art that the procedures for forming the massecuite can be varied, and that the spray drying conditions can be varied, providing the essential conditions of the process are obtained. For example, the sucrose liquor, which may comprise raw or partially refined cane or beet sugar with from 1 to 10 percent noncrystallizable sugar (molasses), is concentrated to prepare it for crystallization, as is well known in the art. The crystallization is then carried out under conditions which promote nucleation, and the formation of fine crystals, thereby obtaining a microcrystalline massecuite. The massecuite, which must be pumpable, is fed to the atomizer of the spray drier. The temperature of the feed can be kept below 50° C.

In the spray drier, part of the water can be removed to achieve a desired final moisture content. The temperature of the drying air can range from 50° C. up to at least 85° C., the volume and time of contact of the drying air with the sprayed droplets being controlled, so that the product is discharged from the bottom of the drier with the desired final moisture content.

The sucrose massecuite as sprayed can contain from 15 to 25 percent water by weight. In the spray drier, the water content can be reduced to from 2 to 5 percent by weight. The residual water in the aggregates as discharged from the bottom of the spray drier defines the amount of residual saturated solution. For example, a range of 2 to 5 percent water corresponds with the range of about 6 to 15 percent residual saturated sucrose solution, which will contain the molasses or other noncrystallizable sugar. In the aging and final drying, additional sucrose can be crystallized from the saturated solution, and the noncrystallizable sugar converted to a solid solution. The final product can contain several per cent free water, such as 1 to 2 percent, but in a preferred embodiment, the final product is substantially anhydrous, containing less than 0.5 percent by weight water.

Since the granular aggregates produced by the method of this invention each contain a multiplicity of microcrystals, it will be understood that the initial crystallization should be conducted so as to limit the growth of large size crystals. However, an equilibrium condition for the production of a microcrystalline massecuite can easily be obtained. For example, microcrystalline aggregates having microcrystals of an average size of about 20 to 80 microns can be used to prepare a granular product having aggregate particle sizes averaging about 100 to 200 microns. It will be understood that these dimensions are illustrative and not necessarily limiting. Oversize or under-size granular aggregates can be screened and removed from the final product, the aggregates being redissolved in the feed to the crystallizers or otherwise reprocessed.

The granular aggregates produced in accordance with the present invention are rapidly and completely soluble in water. This is apparently due to the relatively large surface area of the microcrystals in the aggregates and of the somewhat porous or fissured nature of the aggregates. Products produced by the spray-crystallization process of this invention have compared in solubility characteristics with crystalline sugar products produced in other ways and found to be significantly more soluble.

We claim:

1. Process of preparing a granular crystalline product from a partially refined sucrose liquor composed of a water solution of sucrose containing molasses, characterized by the steps of:
    a. subjecting said solution to partial crystallization form a massecuite composed essentially of microcrystals of sucrose dispersed in a substantially saturated water solution of sucrose containing said molasses, said massecuite being pumpable and sprayable;
    b. spraying said massecuite into a drying air stream to form atomized droplets containing a multiplicity of said sucrose microcrystals in each of said droplets and to remove part of the water from said droplets in said air stream to form granular aggregates of said sucrose microcrystals therein containing residual portions of said sucrose solution and said molasses;
    c. aging and drying the said granular aggregates to crystallize additional sucrose from said residual portions and to further reduce the water content thereof.

2. The granular crystalline sucrose product produced by the process of claim 1.

3. Process of preparing a granular crystalline product from a sucrose liquor composed principally of sucrose in aqueous solution with molasses, characterized by the steps of:
    a. subjecting said liquor to partial crystallization to form a massecuite composed essentially of microcrystals of sucrose dispersed in a substantially saturated water solution of sucrose containing said molasses, said massecuite being pumpable and sprayable;
    b. spraying said massecuite into a drying air stream to form atomized droplets containing a multiplicity of said sucrose microcrystals in each of said droplets and removing part of the water from said droplets in said air stream to form granular aggregates of said sucrose microcrystals therein containing residual portions of said sucrose solution and said molasses, the temperature of said air stream being controlled to limit the drying so that said aggregates on removal from said drying air stream contain about 2 to 5 percent water by weight;
    c. aging and drying the said granular aggregates to form additional sucrose crystals therein and to further reduce the water content thereof.

4. The process of claim 3 wherein said step "b" is carried out in a spray dryer, and said aggregates as formed in said spray prior to said step "c" contain total water of 2 to 5 percent by weight.

5. Process of preparing a granular crystalline product from a cane sugar liquor composed of sucrose in aqueous solution and containing molasses, said liquor containing about 15 to 25 percent water by weight, and a Brix of about 75° to 85°, characterized by the steps of:
    a. subjecting said liquor to partial crystallization to form a massecuite composed essentially of microcrystals of sucrose dispersed in a substantially saturated water solution of sucrose containing molasses, said massecuite being pumpable and sprayable;
    b. pumping said massecuite to a spray dryer and spraying said massecuite therein into a drying air stream to form atomized droplets containing a multiplicity of said sucrose microcrystals in each of said droplets and removing part of the water from said droplets in said air stream to form granular aggregates of said sucrose microcrystals therein containing residual portions of said sucrose solution, said granular aggregates as removed from said spray dryer containing from 2 to 5 percent water by weight;
    c. aging and drying to said granular aggregates to form additional sucrose crystals therein and to further reduce the water content thereof.

6. Process of preparing a granular crystalline product from a water solution of sucrose containing from 1 to 6 percent by weight of noncrystallizable sugar, characterized by the steps of:
    a. subjecting said solution to partial crystallization to form a massecuite composed essentially of microcrystals of sucrose dispersed in a substantially saturated water solution of sucrose containing said noncrystallizable sugar, said massecuite being pumpable and sprayable;
    b. spraying said massecuite into a drying air stream to form atomized droplets containing a multiplicity of said sucrose microcrystals in each of said droplets and to remove part of the water from said droplets in said air stream to form granular aggregates of said sucrose microcrystals therein containing residual portions of said sucrose solution and noncrystallizable sugar;
    c. aging and drying the said granular aggregates to crystallize additional sucrose from said residual portions and to further reduce the water content thereof.

* * * * *

UNITED STATES PATENT OFFICE
CERTIFICATE OF CORRECTION

Patent No. 3,619,293       Dated November 9, 1971

Inventor(s)  MASAHIRO NIIMI ET AL.

It is certified that error appears in the above-identified patent and that said Letters Patent are hereby corrected as shown below:

In the heading of the patent, line 15, the Serial No. "593,372" should read "593,327".

Column 1, line 10, the Serial No. "593,372" should read "593,327".

Column 7, line 34, after "crystallization" the word "to" should be inserted.

Signed and sealed this 25th day of July 1972.

(SEAL)
Attest:

EDWARD M. FLETCHER, JR.
Attesting Officer

ROBERT GOTTSCHALK
Commissioner of Patents